United States Patent
Tzidon et al.

(10) Patent No.: US 9,768,479 B2
(45) Date of Patent: Sep. 19, 2017

(54) HYBRID METAL AIR SYSTEM AND METHOD

(71) Applicant: PHINERGY LTD., Lod (IL)

(72) Inventors: Dekel Tzidon, Hod Hasharon (IL); Avraham Yadgar, Kiryat Ono (IL)

(73) Assignee: PHINERGY LTD., Lod (IL)

( * ) Notice: Subject to any disclaimer, the term of this patent is extended or adjusted under 35 U.S.C. 154(b) by 0 days.

(21) Appl. No.: 15/108,368

(22) PCT Filed: Jan. 1, 2015

(86) PCT No.: PCT/IL2015/050010
§ 371 (c)(1),
(2) Date: Jun. 27, 2016

(87) PCT Pub. No.: WO2015/101999
PCT Pub. Date: Jul. 9, 2015

(65) Prior Publication Data
US 2016/0322681 A1    Nov. 3, 2016

Related U.S. Application Data

(60) Provisional application No. 61/922,903, filed on Jan. 2, 2014.

(51) Int. Cl.
*H01M 12/06* (2006.01)
*H01M 8/0656* (2016.01)
(Continued)

(52) U.S. Cl.
CPC .......... *H01M 12/06* (2013.01); *F02M 25/12* (2013.01); *F23D 14/28* (2013.01); *H01M 8/0656* (2013.01);
(Continued)

(58) Field of Classification Search
CPC ..... H01M 12/06; H01M 8/0656; F23D 14/28; F02M 25/12
See application file for complete search history.

(56) References Cited

U.S. PATENT DOCUMENTS 4,081,693 A * 3/1978 Stone .................. B60L 11/1805
                                                        180/65.8
7,229,710 B2    6/2007 Tao et al.
(Continued)

FOREIGN PATENT DOCUMENTS

CA    2651610    1/2010
CN    1440089    9/2003
(Continued)

OTHER PUBLICATIONS

Office Action of Canadian Application No. 2,934,990 mailed on Aug. 31, 2016.
(Continued)

*Primary Examiner* — Cynthia K Walls
(74) *Attorney, Agent, or Firm* — Pearl Cohen Zedek Latzer Baratz LLP

(57) ABSTRACT

A hybrid system for producing electricity by a metal-air cell and for utilizing hydrogen released during the operation of the metal-air cell for producing energy in the form of electricity, mechanical power or heat energy. The hybrid electric energy system includes at least one metal-air cell and at least one hydrogen conversion unit.

19 Claims, 1 Drawing Sheet

(51) Int. Cl.
*H01M 16/00* (2006.01)
*F02M 25/12* (2006.01)
*F23D 14/28* (2006.01)

(52) U.S. Cl.
CPC ... *H01M 16/003* (2013.01); *F23C 2900/9901* (2013.01); *Y02E 60/321* (2013.01)

(56) References Cited

U.S. PATENT DOCUMENTS

| | | | |
|---|---|---|---|
| 7,910,250 | B2 | 3/2011 | Hsu |
| 7,940,028 | B1 | 5/2011 | Hermann et al. |
| 2003/0143446 | A1 | 7/2003 | Faris |
| 2012/0038314 | A1 | 2/2012 | Stewart et al. |
| 2012/0041627 | A1 | 2/2012 | Kelty et al. |
| 2012/0041628 | A1 | 2/2012 | Hermann et al. |
| 2012/0301751 | A1 | 11/2012 | Fertman |
| 2013/0087305 | A1* | 4/2013 | Ikeya ............ B60H 1/14 165/41 |

FOREIGN PATENT DOCUMENTS

| | | |
|---|---|---|
| CN | 102055046 | 5/2011 |
| CN | 102985270 | 3/2013 |
| JP | 2001-519587 | 10/2001 |
| JP | 2005-536174 | 11/2005 |
| JP | 2007-524204 | 8/2007 |
| JP | 2011-228162 | 11/2011 |
| JP | 2012-239245 | 12/2012 |
| JP | 2013-542547 | 11/2013 |
| JP | 2014-21606 | 11/2014 |
| JP | 2015-106486 | 6/2015 |
| JP | 2015-528986 | 10/2015 |
| KR | 2013-0001170 | 1/2013 |
| WO | WO 2010/050028 | 5/2010 |
| WO | WO 2014009951 | 3/2014 |

OTHER PUBLICATIONS

Search Report of International Application No. PCT/IL2015/050010 mailed on Apr. 28, 2015.
Office Action of Korean Application No. 10-2016-7021080 mailed on Sep. 9, 2016.
English Translation of Office Action of Japanese Application No. 2016-543666 mailed on Jan. 17, 2017.
Office Action of Chinese Application No. 2015800112955 mailed on Apr. 6, 2017.
European Search Report of Application No. EP15733307 dated Jun. 19, 2017.

* cited by examiner

HYBRID METAL AIR SYSTEM AND METHOD

CROSS-REFERENCE TO RELATED APPLICATIONS

This application is a National Phase Application of PCT International Application No. PCT/IL2015/050010, International Filing Date Jan. 1, 2015, entitled "Hybrid Metal Air System and Method", published on Jul. 9, 2015 as International Patent Application Publication No. WO 2015/101999, claiming priority of U.S. Provisional Patent Application No. 61/922,903, filed Jan. 2, 2014, which is incorporated herein by reference in its entirety.

BACKGROUND OF THE INVENTION

Aluminum-air electrical cells are known in the art. Such Al-Air cells suffer of loss of efficiency due to corrosion of the Al anode in the cell. Another drawback of the parasitic corrosion in Al-Air cells is the hazard stemming from the amount of hydrogen (H) released in the form of gas during the operation of the cell. This process consumes aluminum without giving electric energy, and creates a potential hazard due to the released hydrogen. The undesired consumption of the aluminum anode is higher when no electricity is produced and is lower when electricity is produced.

The hazard of explosion of released hydrogen is typically low when the relative amount of the released hydrogen in air is small, or when the relative amount of released hydrogen in air is high and close, or equal to 100%. In both mixture ranges the mixture of hydrogen in air is far from its flaming point. In the remaining mixture range the mixture is highly flammable and explosive.

Columbic efficiency is defined to be the ratio between the amount of aluminum that was consumed and utilized for electricity and the total amount of aluminum consumed (including corrosion).

There is a need to increase the utilization of the aluminum anode and to lower the hazard from released hydrogen during the operation of the Al-Air cell.

SUMMARY OF THE INVENTION

A hybrid electric energy system is disclosed, the hybrid system comprising at least one metal-air cell for producing electric power, the metal-air sell releases hydrogen during the production, and at least one hydrogen energy conversion cell to consume at least a portion of the released hydrogen. The hydrogen energy conversion cell may comprise burning reactor, which may be, according to some embodiments of the present invention, an internal combustion engine or may comprise a fuel cell.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
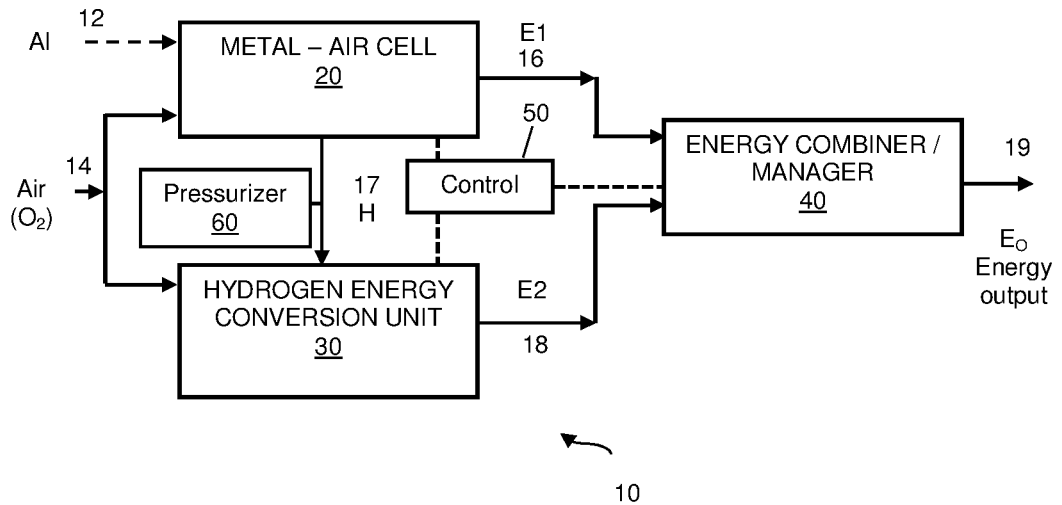
FIG. 1 is a schematic block diagram of an exemplary hybrid electric energy system constructed and operative according to some embodiments of the present invention.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention. In order to minimize energy loss and additionally in order to lower the production costs of an energy unit in a system utilizing metal-air cell, the potential energy included in the released hydrogen may be utilized, for example, using device other than the metal-air cell, thus increasing both the overall efficiency of the system either energy-wise, money-wise or both, as well as its safety.

Reference is made to FIG. 1, which is a schematic block diagram of a hybrid electric energy system 10 constructed and operative according to some embodiments of the present invention. Hybrid system 10 comprises at least one metal-air cell 20, for example Al-Air cell (or cells), and at least one hydrogen energy conversion unit 30, to consume at least a portion of the hydrogen produced by metal-air cell 20. Hybrid system 10 may optionally comprise energy combiner/manager unit 40 to receive the energy produced by systems 20 and 30 and to provide energy at its output 19. Hybrid system 10 may optionally include a pressurizer 60 to pressurize the hydrogen produced in cell 20. Hybrid system 10 may further comprise energy control unit 50 that may be in active communication with at least Metal-air cell 20 and hydrogen conversion unit 30, and further may be in communication with energy combiner/manager unit 40, to control and manage the energy production of hybrid system 10 and with pressurizer 60 to control the hydrogen pressure delivery from cell 20 to unit 30.

In some embodiments metal-air cell (e.g., Al-Air cell, Mg-air cell, Zn-air cell, Si-air cell, Li-air cell or the like) 20 may produce during operation electric power, provided for example, at outlet 16 (E1). However, metal-air cell 20 typically undesirably consumes 1%-20% of the overall consumed aluminum at the anode by corrosion. Therefore, metal air cell 20 may produce and release hydrogen during the electric power production, without producing any electricity. According to some embodiments of the present invention the released hydrogen in typical aluminum-air system, for example hydrogen flowing in conduit 17 out of metal-air cell 20, may at least partially be consumed by hydrogen conversion unit 30 to produce energy. hydrogen conversion unit 30 may be any energy conversion device energizable by hydrogen, such as hydrogen fuel-cell or any other adequate energy conversion system operable with hydrogen, to produce additional electrical power to be provided at outlet 18 (E2), or to energize, for example, two-stroke combustion engine to produce mechanical energy, or to burn the hydrogen to produce heat energy, or the like. The energy produced by metal-air cell 20 and the energy produced by hydrogen energy conversion unit 30 may be combined, coordinated or, in general, managed by energy combiner/manager unit 40 to provide energy by hybrid system 10. In one exemplary embodiment, when unit 30 is a fuel cell that produces electricity, combiner 40 may combine the electricity from cell 20 in parallel to unit 30. In another exemplary embodiment, when unit 30 is a combustion engine, combiner 40 may supply the electricity produced by the metal-air cell to an electricity consumer and the mechanical energy produced by the combustion engine to a mechanical energy consumer. Alternatively, combiner 40 may convert the mechanical energy to an electrical energy (e.g., using a dynamo) and may further supply both electrical energies in parallel.

In some embodiments, system 10 may further include pressurizer unit 60 for pressurizing the hydrogen produced in metal-air cell 20. Pressurizer 60 may increase the pressure of the hydrogen produced in cell 20 to the level that is required by unit 30. Pressurizer 60 may include a compressor and a valve for regulating the supply of hydrogen from metal-air cell 20 to hydrogen conversion unit 30. Pressurizer 60 may be connected to a header tank (not illustrated) that serves as a buffer for the generated hydrogen. This may allow generating the correct conditions for usage of the hydrogen in hydrogen energy conversion unit 30.

As seen in FIG. 1, the sources of energy may be, according to some embodiments of the present invention, aluminum provided to metal-air cell 20, for example as one bulk until the aluminum has been fully exhausted, as described by arrow 12. Hybrid system 10 may further be fed with oxygen from ambient air, or oxygen enriched air, which is required in both metal-air cell 20 and Hydrogen conversion unit 30.

In some embodiments, hydrogen energy conversion cell 30 may consume substantially all the released hydrogen produced by metal-air cell 20 thus reducing the concentration of released hydrogen in air below hydrogen explosion point, i.e., below 4 volume % hydrogen. Hydrogen unit 30 may be selected or designed to be operative with the amounts of hydrogen calculated to be released from a given metal-air cell 20, desirably properly operable through the full range of amounts of released hydrogen at any given time of operation or any given working point, thus ensuring operability through the whole range of operation of metal-air cell 20. For a given number of metal-air cells, a proportional number of hydrogen energy conversion cells 30 may be selected to allow wide range of operability of the hydrogen conversion unit (such as hydrogen conversion unit 30) to be fueled by the amount of hydrogen that is actually released from the metal-air cell, such as metal-air cell 20. In some embodiments, hydrogen energy conversion cell 30 may be adapted to convert the released hydrogen into consumable power. Hydrogen energy conversion cell 30 may be adopted to produce energy in at least one of electricity, heat, and mechanical energy forms. For example, hydrogen energy conversion cell 30 may be a hydrogen fuel-cell that produces electricity, a burning reactor (e.g. a combustion hydrogen engine) that produces mechanical energy or heat and/or any other hydrogen operable energy conversion device.

The amount of hydrogen that is released during the operation of an array of metal-air cells (i.e., the columbic inefficiency of the Al-Air cells) depends on various parameters, such as the magnitude of consumed electrical current, the temperature of the cells, etc. The selection of the operational parameters of the metal-air cell, and the selection of the type and capacity of hydrogen energy conversion unit and its operational parameters may be tuned, according to some embodiments of the present invention, for best available energetic efficiency, that is—highest amount of produced energy $E_O$ from the theoretically available energy in the consumed aluminum in the metal-air cell It will be noted that operating an energy system according to some embodiments of the present invention to achieve best energetic efficiency may dictate operation in conditions which provide best available energetic efficiency but cause very high energy costs. For example, in the first energy unit, using aluminum purified to a level of 99.999% Al (5N) may provide additional 5% of energetic efficiency for twice the costs of production of the 99.99% Al (4N) purified aluminum, since larger amount of corrosion is formed and larger amount of hydrogen is released using less purified aluminum.

An aluminum air cell normally operates at voltage levels of 0.9-1.3 volts. For a given temperature, increasing current draw decreases cell voltage and increases corrosion, and decreasing current draw increases voltage and increases corrosion. The overall metal-air cell efficiency at a given moment is given by $$\text{eff}_1 = (\text{columbic efficiency}) \times (\text{cell voltage}/2.71) \quad (1)$$

where 2.71 is the theoretical voltage of an aluminum air cell (for metals other than Aluminum different theoretical voltage may be used). When using hydrogen fuel cells to consume the hydrogen that is released from the aluminum air cells, the overall hybrid electric energy system efficiency is given by $$\text{eff}_2 = (\text{columbic efficiency}) \times (\text{cell voltage}/2.71) + (1 - \text{columbic efficiency}) \times (\text{hydrogen conversion unit efficiency}) \quad (2)$$

Therefore, adding the hydrogen conversion unit may imply that it would be more efficient to run the metal air cells, such as al-air cells, in less efficient conditions (e.g., higher voltage, more corrosion), and exploit the additional hydrogen such that the overall hybrid electric energy system efficiency is increased. A controller, such as control unit 50, may calculate the momentary overall hybrid electric energy efficiency and change the operating parameters of the metal air cell accordingly, for example by controlling/changing the drawn current or the temperature of the metal-air cell. Some of the operational parameters may be controlled by controller 50. In some embodiments, the controllable parameters may include at least one of: the drawn electrical current, the temperature of an electrolyte in the metal air cell, and the hybrid electric energy system total voltage. In some embodiments, control unit 50 may control the pressure of the hydrogen gas delivered to the hydrogen energy conversion unit, by for example, controlling pressurizer 60.

Some operational parameters may not be controlled by control unit 50, for example, the metal electrode purity level included in the metal-air cell. For example, metal-air cell 20 may consume a metal electrode having less than 99.999% purity figure, e.g., 99.0%-99.99% purified aluminum while the hybrid electric energy system efficiency will be kept high due to proper utilization of the produced hydrogen.

In some embodiments, the operational parameters of at least one metal-air cell 20 and at least one hydrogen energy conversion cell 30 included in system 10 may be such that the metal-air cell efficiency is less than a predetermined optimized efficiency, while the hybrid electric energy system efficiency is higher than the predetermined optimized efficiency. The predetermined optimized efficiency may be defined as efficiency calculated for the metal-air cell when the metal-air cell is operated in optimized conditions (e.g., the highest possible efficiency of the metal-air cell in given conditions). The optimized efficiency (e.g., energy efficiency) may be calculated when the metal-air cell is operated using highly purified metal anode (e.g., at least 99.999% aluminum), an optimized voltage and/or optimized temperature, such that energy losses due corrosion and hydrogen production are as low as possible. Methods of finding the optimized parameters for operating a metal-air cell to have the highest possible efficiency are well known in the art. Operating a metal air cell in non-optimal inefficient conditions will result in low production of electricity and high production of undesired hydrogen. Embodiments of the present invention are related to deliberately operating metal-air cell 20 included in system 10 in non-optimal inefficient conditions, in order to have higher hybrid electric energy system 10 efficiency. The hybrid electric energy system efficiency may be higher than the predetermined optimized efficiency (calculated for the metal-air cell).

In one example, a metal-air cell operating with an aluminum purified to a level of 99.999% has a columbic efficiency of 95% and a cell voltage of IV. The same metal air may be operated with a columbic efficiency of 65% and a cell voltage of 1.4V. In the first case, the metal-air cell energy efficiency is ~35%, whereas in the second case, the metal-air energy efficiency is ~34%. It is therefore more efficient to operate the aluminum-air cell in the first set of operational parameters and the predetermined optimized energy efficiency may be set to be ~35%. However, when the metal-air cell in included in a hybrid electric energy system, such as system 10, 50% of the lost energy clue to corrosion can be restored in the hydrogen conversion unit. Therefore, the hybrid electric energy system energy efficiency is ~38% in the first case and ~51% in the second case. It is therefore beneficial to operate the metal-air cell in sub-optimal conditions, i.e., set the operational parameters to give less than the predetermined optimized energy efficiency of ~35% (e.g., ~34%) in order to improve the overall performance of the hybrid electric energy system, and achieve a higher hybrid electric energy efficiency compared to the metal-air battery alone. Accordingly, controller 50 may control the operation of metal-air cell 20 to work at a voltage of 1.4V to achieve hybrid electric energy efficiency of ~51%.

According to other embodiments of the present invention, the selection of operational point and operational parameters of the metal-air cell and the selection of the hydrogen energy conversion unit and its operational conditions may be done so as to achieve best energy conversion rate money wise (i.e., cost efficiency). In some embodiments, the operational parameters of the at least one metal-air cell and those of the at least one hydrogen energy conversion cell may be such that the metal-air cell cost efficiency is less than a predetermined optimized cost efficiency, while the hybrid system cost efficiency is higher than the predetermined optimized efficiency. This means that the leading consideration will be the total cost of production of one energy unit at the output of the system ($E_O$).

The predetermined optimized cost efficiency may be calculated for metal-air cell 20 when the metal-air cell is operated in optimal conditions (optimal operational parameters) to give the best price per unit of energy, as given in equation (3). The higher the cost efficiency the lower is the price of the produced energy. For example, the predetermined optimized cost efficiency may be calculated when the metal-air cell is operated using high purity metal and high columbic efficiency. Embodiments of the present invention are related to deliberately operating metal-air cell 20 included in system 10 in non-optimal inefficient conditions, in order to have higher hybrid electric energy system 10 cost efficiency, meaning that the overall price of energy production in hybrid system 10 when metal-air cell 20 is operated in non-optimal inefficient conditions is lower than the price of energy production in metal-air cell 20 alone when metal-air cell 20 is operated in optimized efficient parameters. As explained above, under this definition, a less purified aluminum may be used in the metal-air cell, e.g., 99.9% (3N) purified aluminum or even 99% (2N) purified aluminum, which may lead to relatively large amount of hydrogen produced in the metal-air cell. The produced hydrogen may be used to produce electrical or mechanical energy in the hydrogen conversion unit, yet with relatively lower aluminum costs, so that the total cost of production of one energy unit will be lower than those incurred when aluminum with higher purification figure is in use.

The cost efficiency may be defined as:

$$\text{Eff}_{cost} = 1/\text{cost per unit of energy (e.g. kWh/\$)} \tag{3}$$

For example, an aluminum air battery may use high purity aluminum such as 5N aluminum (99.999% pure aluminum) and achieve a hydrogen evolution rate that is equivalent to 0.5% to 3% of the electricity that is drawn from the battery. Replacing 5N aluminum with 2N aluminum that is 90% cheaper will increase the hydrogen generation to be equivalent to 10%-35% of the electricity drawn from the battery, therefore, cause energy loss, safety hazards, and possible faulty operation. Therefore, an aluminum-air cell operated by a 5N aluminum electrode may be 4 times more cost efficient than the cell operated by a 2N aluminum electrode. In a hybrid system, the hydrogen is used in the hydrogen energy convertor to recover at least 30%-50% of the energy, while consuming the hydrogen and reducing the release of hydrogen to a safety hazard. The total cost efficiency of the hybrid electric energy system that includes metal-air cell operated by the 2N aluminum electrode may be higher than the cost efficiency of an aluminum-air cell operated by the 5N aluminum electrode by at least a factor of 2. Therefore, by replacing the high purity aluminum with lower grade aluminum, the energy production costs may be reduced by a factor of 3 to 10.

In some embodiments, control unit 50 may further be configured to select the operational parameters based on historical data saved in a memory associated with control unit 50. For example, historical operational parameters, corresponding calculated efficiencies and/or energy consumption patterns may be daily/weekly/monthly/yearly stored in the memory and may further be used by control unit 50 for selecting the operational parameters that result in the best total efficiency (e.g., energy efficiency or cost efficiency) of hybrid system 10. Controller 50 may select controllable and non-controllable parameters based on the historical data. For example, controller 50 may send a recommendation to a user to replace the metal anode in the metal-air cell to a lower purity metal in order to improve the cost efficiency based on data collected in the past. The user may receive the recommendation on a display associated with control unit 50. For example, the display may be a screen in a vehicle's multimedia system or a mobile device associated with the user that may remotely (e.g., wireless) communicate with control unit 50. In yet another example, control unit 50 may change the temperature in cell 20 and/or the hydrogen pressure supply to unit 30 (e.g., using pressurizer 60) in order to improve the energy efficiency of hybrid system 10 based on data collected in the past.

Figure 2:
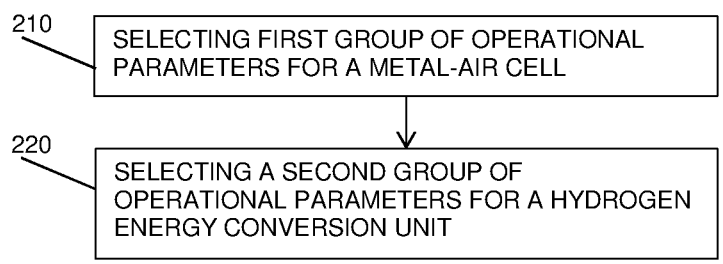
FIG. 2 is a flowchart of a method of selecting parameters for a hybrid metal-air system according to some embodiments of the invention.

Reference is made to FIG. 2 that is a flowchart of a method of operating a hybrid electric energy system according to some embodiments of the invention. In box 210, the method may include selecting a first group of operational parameters for a metal-air cell (e.g., cell 20) included in the hybrid electric energy system (e.g., system 10). In some embodiments, parameters for operating the metal-air cell may be selected such that the metal-air cell may be operated inefficiently. For example, the operational parameters may be selected such that an excess of hydrogen may be produced during the metal anode corrosion without producing electricity. Such conditions may decrease the energy efficiency and/or the cost efficiency of the metal-air cell to be below predetermined optimized energy efficiency or optimized cost efficiency level. The optimized energy efficiency may be defined as the heist possible energy efficiency for a given cell at a given conditions calculated according to equation 1. The optimized cost efficiency for a given cell may be defined as the highest amount of energy produced per a given price (e.g., kWh/$) of a given cell.

In one embodiment, the first group of operational parameters may include the degree of purity of a metal anode of the metal-air cell, for example, metal-air cell 20 may be assembled (or included) a metal anode having less than 99.999% pure metal, such that the cost efficiency of the metal-air cell may be below a predetermined cost efficiency level. In another embodiment, the first group of operational parameters may include a temperature of an electrolyte included in the metal-air cell, for example, the temperature of an electrolyte may be set to be between 70-85° C. In yet another embodiment, the first group of operational parameters may include the voltage of the metal-air cell, for example, 1.4 V. Such parameters may cause the metal-air cell to operate inefficiently.

In some embodiment although the first group of operational parameters may be selected such that the metal-air cell efficiency is less than the predetermined optimized efficiency however, the hybrid electric energy system total efficiency is higher than the predetermined optimized efficiency. Since at least a portion of the produced hydrogen (e.g., at least 65%) is converted into energy in the energy conversion unit (e.g., unit 30) the total efficiency (e.g., energy efficiency or cost efficiency) of both the metal-air cell and the energy conversion unit is higher than the predetermined optimized efficiency.

In box 220, the method may include selecting a second group of operational parameters for a hydrogen energy conversion unit (e.g., cell 30) included in the hybrid electric energy system. The second group may include selecting the hydrogen energy conversion cell to be at least one of: a hydrogen fuel cell and a burning reactor. In some embodiments, the second group may further include more detailed operation conditions of the hydrogen energy conversion cell. For example, the second group may include the pressure at which hydrogen is being supplied to the hydrogen energy conversion cell (e.g., by pressurizer 60), the rate of burning of the hydrogen, the size and type of the combustion chamber, rate and pressure of air or oxygen flow into the conversion unit, the unit's working temperature.

According to some embodiments of the present invention, the issue of hazard due to released hydrogen, as described above, is solved in an energy system built and operating according to embodiments of the invention whether planned and operated towards best available energetic efficiency, or towards best available economic efficiency. Hydrogen released in the first energy unit may be consumed and may be converted into energy in the second energy unit while reducing its quantities to safe levels. The first and second energy units may be connected to each other by leakage proof means ensuring that no hydrogen is released from the system thus all of the hydrogen that is released in the process of the first energy unit is consumed (i.e., burned or chemically reacted) in the second energy unit, with or without energy contribution to the overall energy of the hybrid system.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A hybrid electric energy system comprising:
    at least one metal-air cell for producing electrical power, said at least one metal-air cell releases hydrogen during said production; and
    at least one hydrogen energy conversion unit to consume at least a portion of the released hydrogen, wherein the at least one hydrogen energy conversion unit comprising burning reactor.

2. The hybrid electric energy system of claim 1 wherein the at least one hydrogen energy conversion unit converts the released hydrogen into consumable power.

3. The hybrid electric energy system of claim 2 wherein the at least one hydrogen energy conversion unit comprising hydrogen fuel cell.

4. The hybrid electric energy system of claim 1 wherein said burning reactor is an internal combustion engine.

5. A hybrid electric energy system according to any one of the preceding claims, further comprising a control unit configured to:
    control controllable parameters of the at least one metal-air cell and the at least one hydrogen energy conversion cell.

6. The hybrid electric energy system of claim 5, wherein the controllable parameters include at least one of: temperature of an electrolyte in the metal air cell, pressure of the hydrogen gas in the hydrogen energy conversion cell, and the hybrid electric energy system total voltage or power.

7. The hybrid electric energy system of claim 1 wherein the at least one metal-air cell comprises a metal electrode having less than 99.999% pure metal.

8. The hybrid electric energy system of claim 1 wherein the at least one metal-air cell comprises a metal electrode having less than 99.9% pure metal.

9. The hybrid electric energy system of claim 1 wherein said hybrid system is adapted to produce energy in at least one form from: heat and electricity.

10. The hybrid electric energy system of claim 1 wherein the at least one hydrogen energy conversion unit consumes substantially all of the released hydrogen thus reducing the concentration of hydrogen in air below hydrogen explosion point.

11. A hybrid electric energy system comprising:
    at least one metal-air cell for producing electrical power, said at least one metal-air cell releases hydrogen during said production;
    at least one hydrogen energy conversion unit to consume at least a portion of the released hydrogen; and
    an energy combiner manager for combining energy produced by the at least one metal-air cell and energy produced by the at least one hydrogen energy conversion cell.

12. The hybrid electric energy system of claim 11 further comprising:

a system for pressurizing the hydrogen; and a control unit configured to control the hydrogen pressure delivered to the hydrogen energy conversion cell.

13. A method of operating a hybrid electric energy system, comprising:

selecting first group of operational parameters for a metal-air cell included in the hybrid electric energy system;

selecting a second group of operational parameters for a hydrogen energy conversion cell included in the hybrid electric energy system, wherein the first group of operational parameters is selected such that the metal-air cell efficiency is less than a predetermined optimized efficiency, while the hybrid electric energy system total efficiency is higher than the predetermined optimized efficiency.

14. The method of claim 13, wherein the optimized efficiency, metal-air efficiency and hybrid system efficiency are energy efficiencies or cost efficiencies.

15. The method of claim 13 or 14, wherein the first group of operational parameters includes the level of purity of a metal anode of the metal-air cell.

16. The method of claim 15, wherein the first group of operational parameters includes a metal anode having less than 99.999% pure metal.

17. A method according to any one of claims 13-16, wherein the first group of operational parameters includes a temperature of an electrolyte included in the metal-air cell.

18. A method according to any one of claims 13-17, wherein the first group of operational parameters includes the voltage of the metal-air cell.

19. A method according to any one of claims 13-18, wherein the second group of operational parameters includes selecting the hydrogen energy conversion cell to be at least one of: a hydrogen fuel cell and a burning reactor.

* * * * *